United States Patent [19]

Erickson et al.

[11] 4,159,944

[45] Jul. 3, 1979

[54] WASTEWATER ENERGY RECYCLING METHOD

[76] Inventors: Lennart G. Erickson, 1070 E. Meadow Cir., Palo Alto, Calif. 94303; Howard E. Worne, Lyon Industrial Pk., Rte. 73, Berlin, N.J. 08009

[21] Appl. No.: 877,195

[22] Filed: Feb. 13, 1978

[51] Int. Cl.$^2$ .............................................. C02C 1/06
[52] U.S. Cl. ...................... 210/6; 210/7;10;15;18;38 B
[58] Field of Search ...................... 210/2–11, 210/15, 18, 38 B, 54, 57, 58, 59, 73 S, 74, 65–67

[56] References Cited

U.S. PATENT DOCUMENTS

| | | | |
|---|---|---|---|
| 2,658,034 | 11/1953 | Hood | 210/11 |
| 3,801,499 | 4/1974 | Luck | 210/11 |
| 3,994,780 | 11/1976 | Klass et al. | 210/11 |
| 4,083,783 | 4/1978 | Wing et al. | 210/54 R |

FOREIGN PATENT DOCUMENTS 47-45881  11/1972  Japan ......................... 210/10

OTHER PUBLICATIONS

Gaulin Processing Report; "Cell Disruption" Ref. No. 2099, May 1974.
Extract References from P.B.Q & D. Inc. Report re: 12 S.F. Bay Area Counties Wastewaters.
FRYMA—Technical Literature—Waste Water Mill MA.

*Primary Examiner*—Benoit Castel
*Attorney, Agent, or Firm*—Townsend and Townsend

[57] ABSTRACT

An auxiliary process and method for use in wastewater treatment plants, modifying conventional primary and secondary treatment, to condition the effluent for use as agricultural irrigation water containing liquified fertilizer and soil amendment materials. Primary sludge and skimmed materials are comminuted and added to the volume of organic materials available for secondary treatment. A bacterial inoculum is added to accelerate the microbial reduction of biodegradable materials into a biomass of cells. The separated predominantly cellular secondary sludge is processed to rupture the cellular structure thus releasing the protoplasm to colloidal suspension. Combined with the mainflow of secondary clarified effluent, the resultant micro-particulate effluent is thereby conditioned for effective chelation treatment to remove heavy metal ions and for effective disinfection with reduced requirements for toxic reactants. The product is discharged as agricultural irrigation water containing, in solution, agricultural fertilizers as nitrogen, minerals, carbonaceous compounds and oxygen, plus ligno-cellulose soilbuilding materials. The heavy metals may be separated and recycled as a by-product.

9 Claims, 3 Drawing Figures

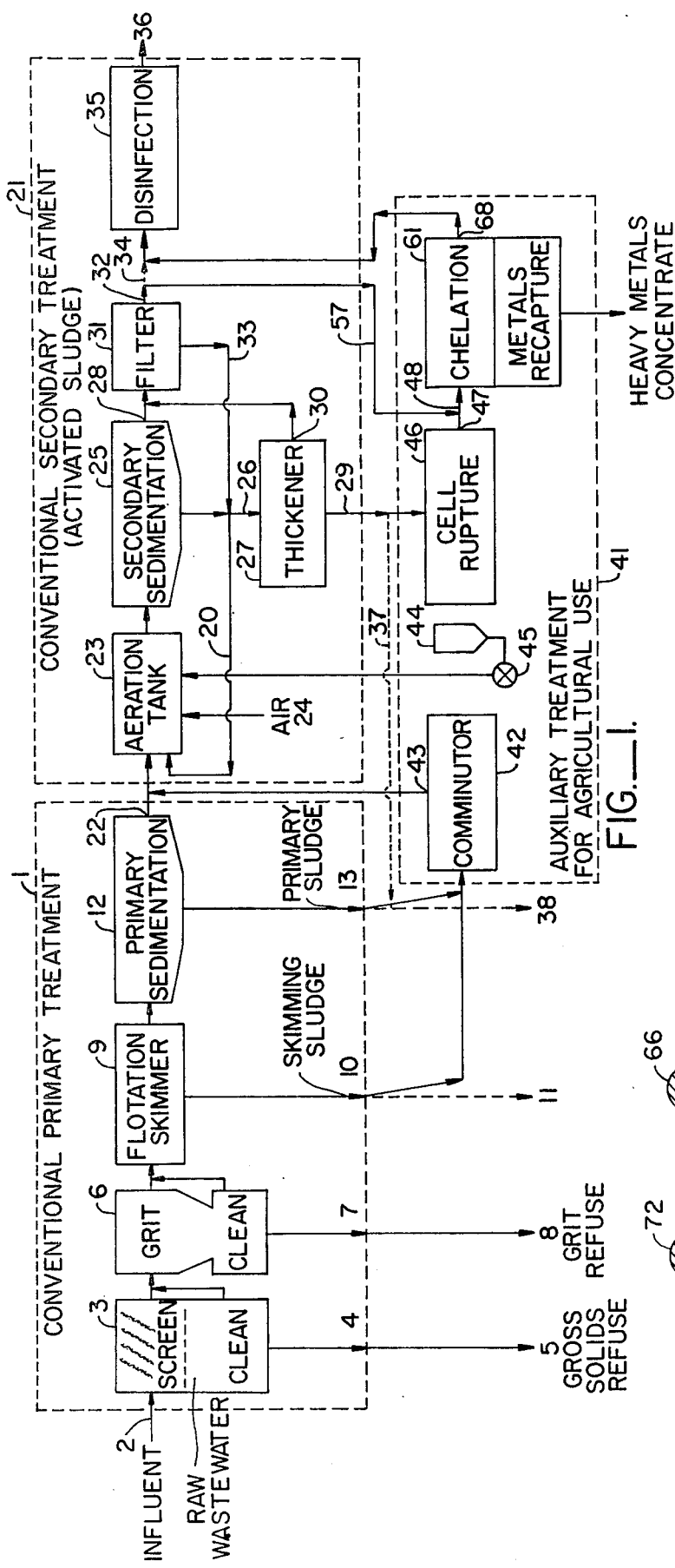
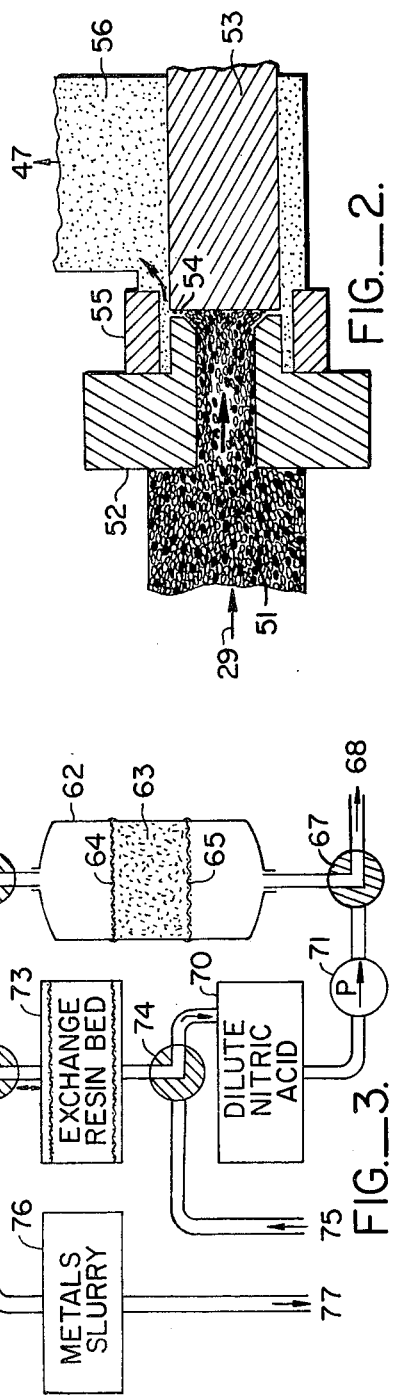

WASTEWATER ENERGY RECYCLING METHOD

BACKGROUND OF THE INVENTION

"The Federal Water Polution Control Amendments of 1972" (PL92-500) and other Federal public laws and regulations reflect the national objectives and public interest in reduction of environmental pollution. In particular this law establishes specific restrictions on discharge of pollutants into the nation's waters by 1985.

To meet the future requirements of law in regard to discharge of sewage wastewater effluents into public waters, it appears that costly tertiary treatment will be needed to remove substantially all solids prior to discharge of the clarified effluent. Additional costs will be incurred for disposal of the resulting sludges.

As wastewaters and most of their solids content are of potential value for irrigation, fertilization and soil conditioning, several studies have been published regarding these opportunities and the related problems.

An excellent review of this subject is the paper "Land Disposal . . . What's the Realistic View" by authors H. L. Michel, P. H. Gilbert and H. K. Cread, published in *Water and Wastes Engineering*, June 1974. This refers to a comprehensive study program completed for the U.S. Army Corps of Engineers by PBQ&D, Inc., Engineers relative to the San Francisco Metropolitan Bay Area.

The potentials of this opportunity are evident from the data published for untreated combined municipal and industrial wastewaters. Expressed in volumes per 1,000,000 persons the daily wastewater flow includes approximately 175 million gallons containing 645 tons of solids including about 87.5 tons of nitrogen plus large quantities of other fertilizer nutrients and soil building materials. Substantial economic and ecologic value potentials are apparent particularly in situations where an urban metropolitan area is adjacent to a water deficit agricultural area. Agricultural fertilizer potential values are substantial. The nitrogen content is of special importance because natural gas is the principal resource used in its manufacture. For instance about 40,000 cubic feet of natural gas is required to manufacture one ton of fertilizer nitrogen, according to *Commercial Fertilizers*, May 1975, published by the Statistical Reporting Service of the U.S. Department of Agriculture.

The study referred to also shows that this typical wastewater flow also contains 3.6 mg/ml or over 5000 pounds each day of heavy metals, principally cadmium, copper, molybdenum, nickel and zinc. These metals are potentially toxic, can accumulate in the soil and can be taken up by growing plants.

Conventional primary and secondary treatment is effective in removing up to 90% of putrescible and other suspended solids. The discharged effluent may then be used for agricultural irrigation; however, such use is limited by the fact that about 60% of gross heavy metals content of the raw wastewater influent is still present in the discharged effluent.

Such treatment produces substantial quantities of sludge as a by-product containing a large content of heavy metals. The opportunities and limitations regarding agricultural uses of sludge are summarized in the following reports published by the Council for Agricultural Science and Technology (CAST), Iowa State University, Ames, Iowa: "Utilization of Animal Manures and Sewage Sludges in Food and Fibre Production", Report 41, Feb. 1975, and "Application of Sewage Sludge to Croplands: Appraisal of Potential Hazards of the Heavy Metals to Plants and Animals", Report 64, Nov. 1976. Heavy metals pollution, particularly by cadmium, is a major limitation. Costs of transportation and incorporation into the ground are major considerations.

BRIEF DESCRIPTION OF THE DRAWING

FIG. 1 is a flow sheet illustrating the conventional activated sludge process including the improved treatment provided by this invention.

FIG. 2 is a detailed view of a cell-rupturing apparatus useful in the process of this invention.

FIG. 3 is an illustration of the chelation aspect of the present invention.

CONVENTIONAL TREATMENT OF SEWAGE WASTEWATERS

The process and method used in conventional activated sludge sewage treatment plant is illustrated in FIG. 1.

*Primary Treatment* facilities 1 for treatment of influent 2, raw wastewater, may include:

Screening 3—to separate pieces of wood, rags, wire, and other sizeable material. Processing may include:
Physical size reduction by grinding or shredding,
Wash-flushing of organic materials back to process stream,
Refuse solids are discharged at 4, typically 12 pounds dryweight per million gallons of influent 2.
Disposal is usually to landfill 5.
Grit Removal 6—to separate relatively heavy gritty materials, sand, ashes, glass and metals. Processing may include:
Efficient separation of solids,
Wash-flushing of organic materials back to process stream,
Refuse grit is discharged at 7, typically 900 pounds dryweight per million gallons of influent 2,
Disposal is usually to landfill 8.
Skimming 9—separation in a floatation tank of oil, grease, scum, floating fibrous trash, etc. Processing may include:
Grinding and dewatering,
Discharge at 10, typically is 230 pounds of dryweight solids per million gallons of influent 2, of which about 200 pounds is oil and grease,
Conventional disposal of residual solids to incineration or landfill 11 completes the process of wasting the potential values of these material resources.
Primary Sedimentation Tank 12 provides for gravity concentration of settleable solids. Primary sludge discharged at 13 contains 4-5% solids, mostly organic matter. Typically, 2500-3000 gallons of sludge is separated per million gallons of influent 2, this containing 1000-2000 pounds dryweight solids.

Secondary Treatment facilities 21 for further treatment of primary effluent 22 may include:
Aeration Tank 23, wherein air 24 is diffused into the recirculating effluent to stimulate microbial growth and proliferation thus converting biodegradable nutrients in solution into cellular biomass.
Secondary sedimentation tank 25 provides for gravity separation of activated sludge, part of which is recirculated 20 back to aeration tank 23 to sustain the biochemical reaction. Typical discharge at 26 is 4000 to 20,000 gallons of activated sludge per million gallons of influent 2, of which 700-900 pounds ($\pm 1\frac{1}{2}\%$) is dryweight solids.

A sludge thickener 27 may be employed in modern treatment plants to dewater this sludge to about 8–16% solids discharged as thickened secondary sludge at 29. The decanted liquid discharged at 30 may be recycled back to secondary effluent 28. Suitable dewatering devices, well known in the art are, for example, centrifuges, vacuum screen belt filters and pressure filters. If necessary, a supplemental dewatering device may be installed to reduce the water content of the secondary sludge discharged at 29, to facilitate subsequent processing according to the method of our invention.

A filter 31 is often included in modern treatment plants as the effluent discharged at 28 may contain up to 100 mg/ml of suspended solids. Preferably particulate matter larger than a few microns in size should be removed. This may be accomplished by use of a revolving microscreen filter and/or a multi-layer sandbed filter or other filter techniques well known in the art. The clarified effluent is discharged at 32 and the separated solids are recycled at 33 back to secondary sludge. If necessary a supplemental filter may be installed to reduce the particulate solids content of the effluent discharged at 32, to facilitate subsequent processing according to the method of our invention.

A disinfection unit 35 is often included in modern treatment plants. The clarified effluent discharged at 32 is usually conveyed via dotted line 34 to the disinfection unit wherein contact with a toxic agent, usually chlorine, is employed to reduce the level of viable pathogenic bacteria to levels prescribed for disposition, usually to waste 36. Alternatively, disinfected secondary effluent 36 may be used for irrigation under limited conditions. Only about 40% of the heavy metals present in raw wastewater influent 2 are removed in primary and secondary treatment operations.

Sludge Conditioning and Disposal: is a major cost item in all conventional wastewater treatment facilities. Usually the Primary sludge 13 and the Secondary sludge 29 are combined via dotted line 37 and discharged at 38 to further processing which may include:
Digestion and thickening,
Physical size reduction grinding,
Dewatering, drying, incineration,
Sludge lagoon digestion thickening or drying,
Dryland spreading or landfill disposal or discharge into oceans, rivers or lakes completes the process of wasting the potential values of these material resources.

Processing for discharge to Agricultural lands may include:
Digestion and drying in sludge lagoons,
Filtration and heat drying,
Composting, sometimes combined with other dry waste materials,
Digestion for wet sludge spreading or irrigation.
Only about 25% of total USA sludge production is applied to land and not all of this land is used for crops. Agricultural uses are subject to the limitation that heavy metals are concentrated in digested mixed sludges typically at levels about 300% dryweight basis above the levels in the raw wastewater influent 2. A further limitation is the fact that the nitrogen content of the raw organic materials in sludges is only slowly released to plant life in the soil—typically 15% during the first year following application.

SUMMARY OF THE INVENTION

This invention provides a method and process for adaptation of modern wastewater treatment plants for conditioning of raw sewage wastewater into agricultural irrigation water, liquid fertilizer and soil amendment materials.

A major object of this invention is to conserve and recycle energy, after allowance for process energy, equivalent to the energy that would otherwise be required for production and delivery of the equivalent volumes of water, liquid fertilizer and soilbuilding materials comprising the product produced by the method and process of our invention.

A major object of this invention is to conserve and recycle to useful agricultural purposes, the natural resource materials and water usually discharged as wastes in conventional sewage treatment operations.

A major object of this invention is to reduce the environmental damage inherent in current practices of discharging conventionally treated sewage wastewaters and sludges to public water resources and lands.

An object of this invention is to provide for comminution of oil and grease and other primary organic skimmings and to recycle such processed materials back to process flow as additional raw organic materials.

An object of this invention is to provide for comminution of primary sludges and to recycle such processed materials back to process flow as additional raw organic materials.

An object of this invention is to improve efficiency of biolytic conversion of the increased throughput of organic raw materials into a biomass of cells by periodic seeding of selected viable microorganisms into conventional secondary treatment aeration tank reactors adapted to the method and process of this invention.

An object of this invention is to rupture the biomass cells comprising the bulk of secondary sludge, thus to release their protoplasm to colloidal suspension.

An object of this invention is to rupture the cell structure and viability of microorganisms often present in secondary sludges including bacteria, fungi, algae, protozoa, rotifers and also eggs, worms and other life forms.

An object of this invention is to rupture the cell structure and viability of seeds and other viable forms of plant life often present in secondary sludges.

An object of this invention is to provide for effective and economical conditioning of sludge from secondary treatment operations into colloidal slurry form for suspension in clarified effluent from such secondary treatment.

An object of this invention is to provide a colloidal slurry in which the cellular structure of organic solids has been ruptured, thus increasing effectiveness of subsequent treatment to remove heavy metal ions.

An object of this invention is for recapture, as a useful by-product, the heavy metals separated by ion chelation treatment of the colloidal slurry.

An object of this invention is to provide a processed wastewater effluent in which the cellular structure of organic solids has been ruptured, thus increasing the effectiveness of subsequent disinfection treatment using a lesser quantity of chlorine, or other disinfection reactant, than would otherwise be required.

Referring to FIG. 1, there is shown schematically the auxiliary facilities 41 necessary to accomplish the objects of this invention, in combination with conventional primary treatment facilities 1 and secondary treatment facilities 21.

A comminutor 42 is employed to receive input raw organic materials discharged as skimming sludge at 10 and as primary sludge at 13. Suitable comminutor equipment for grinding sewage sludge is well known in the art, for instance: Hydraulic Sludge Disintegrator, available from BIF Sanitrol, a unit of General Signal Corp., Largo, Fla.; or, Fryma-Wastewater Mill MA, available from Neumunz, Inc., Leona, N.J.

An optional or supplemental hydraulic pressure-drop reactor may be used for comminution purposes, as described in U.S. Pat. No. 3,939,066 to William J. Bauer.

The comminuted sludge discharged at 43 is a free-flowing slurry with particulate matter reduced in size preferably to diameters of one millimeter or less. Such comminuted solids will more rapidly be decomposed and metabolized in the subsequent biochemical reaction. This slurry is added to the primary effluent 22 flow into aeration tank 23 thus substantially increasing the volume of organic materials available as nutrients for the aerobic cell synthesizing reaction therein.

It may be necessary to accelerate and increase the effectiveness of this biochemical reaction due to this increased volume of organic material. In such event, we prefer to add from batch tank 44 through control valve 45, an inoculating solution of heterotropic aerobic hydrolyzing and cell synthesizing microorganisms.

A crude concentrate of dehydrated bacteria may be used. This is a concentrate of bacteria grown on a nutrient substrate, attached to and harvested with the substrate residue. When dried, a concentration of about five billion viable microorganisms per gram is obtained. This is dispersed in water in the proportion of one pound per five gallons of warm water two hours prior to inoculum addition into aeration tank 23. About one pound of dried microorganisms is used per 4000 pounds of biodegradable organic material, typically 1.35 pounds per million gallons of influent 2. For large installations, the dried microorganisms can be extended 25 to 50 times by growing inoculum cultures in a suitable nutrient substrate solution, thus reducing the quantity of dried microorganisms required to less than 1 or 2 per million gallons of influent 2.

For example, microorganisms employed may include:

| Hydrolyzing microorganisms | Synthesizing microorganisms |
|---|---|
| Bacillus Cereus | Bacillus Licheniformis |
| Bacillus Megaterium | Bacillus Subtilis |
| Bacillus Subtilis | Bacillus Cereus |
| Bacillus Polymyxa | Bacillus Megaterium |
| Bacillus Macerans | Serratia Marcescens |
| Aeromonas Proteolytica | Cellulomonas Sp |
| Arthrobacter Flavescens | Micrococcus Sp |
| Cellulomonas Biazotea | Alcaligenes Sp |
| Streptomyces Cacoai | Nocardia Sp |
| Micromonospora Chalcea | Pseudomonas Sp |
| Serratia Marcescens | Pseudomonas Fluoreslens |
| Fungi | Neurospora Crassa |
| Aspergillus Oryzae | Streptomyces Sp |
| Aspergillus Niger | Saccharomyces Sp |

These microorganisms will hydrolyze and metabolize anionic and non-anionic detergents, cationic shampoos, fabric softeners, hair and paper cellulose fibers and other materials which are not effectively degraded by naturally occurring microorganisms present in sewage wastewaters. Such dried viable microorganisms are available from Bioferm International, Inc., 209 Chester Avenue, Morristown, N.J.

In the practice of this invention, an object is to produce in the secondary sludge a biomass of cells harvested near the top of the logarithmic growth curve for biochemical cell synthesizing solutions, prior to substantial biolysis of the predominant strains of bacteria seeded into solution from batch tank 44. This will avoid loss of valuable organic materials through biochemical decomposition to ash materials.

We have found that each pound of BOD input will produce 0.7 to 0.8 pounds of biomass (wet weight). Cells are ±82% water so dry weight is about 13.5 pounds per 100 pounds of BOD. Dry weight constituents include approximately 45% amino acid proteins, 42% carbohydrates, 6% lipids (fats) plus minerals. Equivalent nitrogen content is about 7% as proteinaceous nitrogen.

Biochemical reactions to this stage can be completed in somewhat less time than for usual aeration tank processing. This factor plus the accelerated reaction resulting from optional addition of inoculating microorganisms provides added flexibility in adaptation of existing waste treatment plants to aeration tank processing of practically all organic materials present in influent 2, a unique feature of our invention.

Cell rupture device 46 has the capacity to rupture the cell structure of organic solids in solution by such thorough mixing action that all parts are made to correspond in structure. Such machines are well known in the art and are usually employed in the chemical industries for dispersal of solids in fluid solutions and for preparation of emulsions.

Suitable cell rupture machines are available from the Gaulin Corporation, Everett, Mass. FIG. 2 illustrates the principle of operation. A reciprocating pump is employed to bring the sludge 51 to hydraulic pressures preferably in the range 3,000 to 10,000 PSIG. Flow movement of the pressurized sludge through valve seat 52 forces open a pre-loaded adjustable valve 53. The sludge flows through the restricted aperture 54 where an instantaneous pressure drop to less than atmospheric pressure occurs, causing shearing action aand cavitation bubbles. The sludge then strikes impact ring 55 at velocities up to about 900 feet per second, further shattering the particles by impact and implosion of the bubbles. In practice, particulate size reduction to less than one micron can be achieved. This is adequate for rupturing of cell structure and destroying viability of practically all biological lifeforms present in the thickened secondary sludge discharged at 29. This fine particulate matter will remain dispersed in solution, with substantially less tendency to settling, precipitation or adherance to surfaces. Heavy metal salts metabolized by the cells are released to solution so can be readily removed in the following chelation step. The colloidal slurry 56 is discharged at 47, combined with the filtered effluent 32 via 57 and flows via 48 into chelation unit 61.

Alternative processing may be employed to rupture the cell structure of the organic solids content of the secondary sludge discharged at 29, without departing from the scope and innovation of the process and method of our invention. Such alternative processing may include use of chemical agents or biochemical enzymes capable of hydrolyzing the cellular walls or membranes.

U.S. Pat. No. 3,979,286 to Robert E. Wing et al. describes a process for Removal of Heavy Metal Ions from Aqueous Solutions with Insoluble Cross-Linked Starch Xanthates. The process involves removal of heavy metal ions from aqueous solutions with an amount of water insoluble cross-linked starch-xanthate chelating material, prepared by first cross-linking starch with a cross-linking reagent and subsequently xanthating the cross-linked starch by reacting the same with carbon disulphide, and wherein said cross-linked starch-xanthate has a degree of cross-linking such that cross-linked starch-xanthate exhibits a degree of swelling in water at 95° of preferably less than 75%, said amount of cross-linked starch-xanthate being such that the molar ratio of the xanthate moiety to metal ions is about 1:1 and has a xanthate degree of substitution of from 0.1 to 1.

Example 35 in the Wing et al. patent illustrates the effectiveness of this process. Tests on nine industrial effluents containing a variety of heavy metal ions were treated with the following results:

|  | Removal Efficiency |  |
| --- | --- | --- |
| Cadmium | 82% | minimum |
| Chromium | 79% | " |
| Copper | 79% | " |
| Iron | 99% |  |
| Lead | 100% |  |
| Nickel | 99% |  |
| Zinc | 99% |  |

Alternatively commercial anion exchange resins containing tertiary amine and quaternary ammonium groups have proved to be useful in industrial wastewater treatment to remove heavy metal ions. Commercial usage is limited by high costs principally related to the fact that these resins are petrochemically based.

In any event, neither the anion exchange resin technology nor the Wing et al. process based on relatively low cost agricultural starch is effective in removing heavy metals from domestic wastewaters and sewage sludges. In this case, a substantial proportion of the content of heavy mineral salts have been metabolized and are shielded from the chelation reaction within the relatively impervious cellular walls. This limitation is resolved by the cell rupture step of our invention, thus releasing the heavy metal salts to colloidal suspension where they can readily be removed by chelation.

FIG. 3 illustrates adaptation of the chelation process to the purpose of our invention. A reactor tank 62 retains a supply of insoluble cross-linked starch-xanthate material in the form of pellets 63 between two grid plates 64, 65. The combined inflow of filtered effluent and colloidal slurry enters the chelation reactor tank at 48 through two-way valve 66 and after flowing through the chelate pellets 63 is discharged through two-way valve 67 is discharged at 68 to flow into disinfection unit 35. Typically for a flow rate of one million gallons per day reactor tank 62 is about 8 feet in diameter and the spacing between grid plates 64, 65 is about 6 feet. Additional pellets are added occasionally to compensate for gradual dissolving of some pelletized chelate material into the process flow.

Release of the metallic salts accumulated, and regeneration of the chelate material 63 may be accomplished by occasional backwash flashing with a 10% nitric acid solution to redissolve the salts in such solution. This can be accomplished as illustrated schematically in FIG. 3 with an acid backwash solution from tank 70 flowing through pump 71, rotated valve 67 the chelate pellets 63, rotated valve 66, valve 72 into an anion exchange resin bed reactor 73. Therein the metallic salts are retained in the resin bed and the clarified acid flows through valve 74 into tank 70 for subsequent reuse. The metallic salts may subsequently be recaptured by backwash flow of water from source 75 through rotated valve 74, through the exchange resin reactor 73, rotated, valve 72 and into metals slurry tank 76. The discharged slurry 77 of metallic salts may be refined to recover the values in metallic content. Alternatively the acid backwash fluid may be neutralized with lime and disposed of as waste. All of the techniques outlined in this paragraph are well known in the art.

An alternative process for removing heavy metal ions in water is described by Joshiaki Kajyama in U.S. Pat. No. 3,890,225, wherein absorption by coral follis limestone in granular form is employed. As is the case with the Wing et al. process, and in all other ion removal processes known to us, such processing is not effective in removal of the heavy metal ions contained within the cellular wall structures comprising much of the biomass of secondary sludges. Other alternative processing methods for heavy metal ion removal may be employed without departing from the scope and innovation of the process and method of our invention.

The conventional disinfection step indicated at 35 usually involves contact chlorination to reduce pathogenic bacteria to levels required by local health authorities. Alternatively ozone may be used as the reactant chemical. Although the effluent discharged at 68, according to the method and process of our invention, contains a substantially increased content of organic materials, relatively little additional disinfection is needed because:

Most pathogenic bacteria have been destroyed by the cell rupturing action of device 46, and The size of such particulate matter has been reduced substantially by action of device 46 and such fine particles are more efficiently treated in disinfection unit 35.

The irrigation-fertilizer effluent discharged at 36 is a unique product, containing in solution most of the components of the wastewater influent 2 except gross solids refuse discharged at 5 and grit refuse discharged at 8 and heavy metals recovered at 77. Due to the cell rupture step in our method, less disinfection treatment is required, resulting in a relatively low residual of disinfection chemicals in the product discharged at 36.

The biodegradable organic material has been biochemically metabolized and stabilized by aerobic cell synthesis reaction. The organic solids content is dispersed in colloidal suspension, having relatively little tendency to precipitation. The product is biochemically inactive. In event of interim storage or delay in distribution, the product can be maintained in biochemically inactive condition by adjustment to maintain the necessary chlorine residual layer, as is well known in the art. When distributed to agricultural lands the organic materials in suspension are in form suitable for relatively rapid uptake by soil microorganisms and plants, as contrasted to the more extended period usually required for biodegrading the organic solids content of conventional wastewaters and sewage sludges.

About 75% of the total nitrogen content of raw wastewater influent 2 is converted by the process and method of our invention into the equivalent of commercial grade liquid fertilizer. The cellular protoplasm content, from ruptured cells, is particularly valuable as a potent and readily available plant nutrient. The nitrogen component of this protoplasm is in the form of proteinaceous nitrogen which is readily assimilated as a plant nutrient.

About 50% of the input effluent flow of carbonaceous materials is present in colloidal suspension in discharged product of our invention mostly in the form of stable biomass cellular debris. Unreacted ligno-cellulose components are also present in fine particulate form. These components are valuable for soilbuilding purposes.

After removal of the heavy metals, the remaining minerals content of our discharged irrigation-fertilizer product is of value for agricultural purposes, including phosphorous, potassium, and trace minerals. Part of these minerals have been metabolized in the aerobic reactor tank 23, discharged to colloidal solution in our cell rupture step 46 and are in a form readily assimilated by vegetation.

The product is useful for general agricultural use as irrigation water containing high quality liquid fertilizers. The product is most effectively used in low density distribution over large land areas with the objective of retaining fertilizer nutrients within the plant root zone.

We believe that our product can be most advantageously used in semi-arid or moisture deficit areas. The warmer climate and long growing season typical of such areas makes irrigation water distribution and efficient utilization possible practically year-round.

In semi-arid semi-desert areas such year-round application of supplemental irrigation water, plus liquid fertilizer and soil amendment materials can be effectively used for production of irrigated grass pasture crops. Over a period of years of such an agricultural and soil-building program, marginal land can be converted to improved land suitable for fieldcrop production.

We believe that a major use for our product will be to supply moisture and nutrients to treecrops grown on marginal lands and continuously harvested, on about a four-year rotation cycle, for fuel or chemical resource content. Specific information about "Energy Ranch" renewable resource production of plant biomass fuel for electric power generation and for SNG gas production is contained in a report "Effective Utilization of Solar Energy to Produce Clean Fuel" prepared by Stanford Research Institute for the U.S. National Science Foundation, SRI Project 2643.

Data in this report shows that major production cost factors are the cost of purchase of irrigation water in water deficit areas and the cost of purchase of commercial fertilizers required for continuous treecrop production. We believe that these costs can be substantially reduced by utilization of the resource value of sewage "wastewaters" conditioned for agricultural use according to the process and method of our invention.

We believe that the total costs of the auxiliary process and method of our invention will be about comparable to total costs of tertiary treatment that will be required by public law for discharge of wastewater effluents to public waters.

In any event, the practice and use of our invention will accomplish a major reduction in environmental damage and economic resource waste resulting from discharge of sewage effluents to public waters and disposal dumping sewage sludge and effluents on land.

We make no claim as to invention in regard to any conventional process or method for primary or secondary wastewater treatment as outlined herein. Nor do we make any claim as to invention in regard to comminutor homogenizer or chelation apparatus, well known in the art for numerous other uses.

Although the foregoing improved method for Wastewater Energy Recycling Method has been described in some detail by way of illustration and example for purposes of clarity and understanding, it is to be understood that certain changes, modifications, and omissions may be practiced within the spirit of the invention as limited only by the scope of the appended claims.

We claim:

1. In the processing of wastewater by primary and secondary treatments, which includes a biochemical reaction according to the activated sludge process wherein the wastewater is separated into a sludge component and a clarified effluent, the improvement for salvaging and recycling the valuable components thereof comprising: comminuting primary sludge separated from said primary treatment and adding the comminuted mass to the organic input for said secondary treatment, subjecting sludge separated from the biochemical reaction of said secondary treatment to sufficient pressure to substantially rupture all of the walls of cells in said sludge and discharge the contents of the cells as part of a colloidal suspension, combining said colloidal suspension with the clarified effluent, and contacting said clarified effluent and colloidal suspension with a metal chelating substrate to remove heavy metals therefrom.

2. The improvement in accordance with claim 1, wherein said pressure is at least about 3,000 PSIG.

3. The improvement in accordance with claim 2, wherein the sludge is subjected to a rapid pressure drop following the application of said pressure to accelerate the particles to cause further shattering by shearing and impact.

4. The improvement in accordance with claim 1, wherein said metal chelating substrate is water insoluble cross-linked starch xanthate.

5. The improvement in accordance with claim 1, wherein said metal chelating substrate is an anion exchange resin containing tertiary amine and quaternary ammonium groups.

6. The improvement in accordance with claim 1, wherein said pressure is sufficient to reduce particle size in said suspension to less than about one micron.

7. The improvement in accordance with claim 1, wherein said pressure is sufficient to substantially destroy biological life forms in the sludge to thereby facilitate any subsequent disinfection treatment of the sludge.

8. The improvement in accordance with claim 1, wherein the biochemical reaction utilized in said secondary treatment is accelerated and increased by adding an inoculating amount of heterotropic aerobic hydrolyzing and cell synthesizing micro-organisms to the organic material undergoing the biochemical reaction of secondary treatment.

9. The improvement in accordance with claim 1, wherein skimmed sludge from said primary treatment is comminuted and added to the organic input for said secondary treatment.

* * * * *